United States Patent
Bacchus et al.

(10) Patent No.: US 12,422,275 B2
(45) Date of Patent: Sep. 23, 2025

(54) PERCEPTION AND MAP EDGE ASSOCIATION SYSTEM FOR ACCOMMODATING INCONSISTENT PERCEPTION AND MAP DATA

(71) Applicant: GM Global Technology Operations LLC, Detroit, MI (US)

(72) Inventors: Brent Navin Roger Bacchus, Sterling Heights, MI (US); Tarek Abdel Raouf Abdel Rahman, Madison Heights, MI (US); Ryan Jay Yergin, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 384 days.

(21) Appl. No.: 18/163,976

(22) Filed: Feb. 3, 2023

(65) Prior Publication Data

US 2024/0263965 A1    Aug. 8, 2024

(51) Int. Cl.
*B60W 40/10*    (2012.01)
*B60W 60/00*    (2020.01)
*G01C 21/00*    (2006.01)

(52) U.S. Cl.
CPC ......... *G01C 21/3859* (2020.08); *B60W 40/10* (2013.01); *B60W 60/001* (2020.02); *G01C 21/3819* (2020.08); *B60W 2520/00* (2013.01); *B60W 2552/00* (2020.02)

(58) Field of Classification Search
CPC ............... B60W 40/10; B60W 60/001; B60W 2520/00; B60W 2552/00; B60W 40/06; B60W 50/02; B60W 50/0205; G01C 21/3859; G01C 21/3819; G01C 21/30; G01S 19/393
See application file for complete search history.

(56) References Cited

U.S. PATENT DOCUMENTS

| | | | |
|---|---|---|---|
| 9,310,804 B1 * | 4/2016 | Ferguson | G05D 1/0246 |
| 2009/0228204 A1 | 9/2009 | Zavoli et al. | |
| 2020/0408536 A1 * | 12/2020 | Fasola | G01S 7/4808 |
| 2022/0242440 A1 * | 8/2022 | Kurtz | G01C 21/3815 |
| 2023/0054914 A1 | 2/2023 | Mennen et al. | |
| 2024/0273920 A1 * | 8/2024 | Sakai | G06V 10/60 |

OTHER PUBLICATIONS

United States Patent and Trademark Office. U.S. Appl. No. 17/401,893, filed Aug. 13, 2021.

* cited by examiner

*Primary Examiner* — Abby J Flynn
*Assistant Examiner* — Paulo Roberto Gonzalez Leite
(74) *Attorney, Agent, or Firm* — Vivacqua Crane, PLLC

(57) ABSTRACT

A perception and map edge association system for an autonomous vehicle includes one or more controllers executing instructions to receive a plurality of perception lane edge candidates that are each representative of a perception lane edge and a plurality of map lane edge candidates that are each representative of a map lane edge. The one or more controllers identify a discrepancy between a selected perception lane edge candidate and a best fit map edge candidate for a lane characteristic based on a posterior association probability matrix and a discrepancy flag. The one or more controllers segment the pair of inconsistent perception and map lane edges into one or more matching segments. The one or more matching segments indicate where the perception lane edge and the map lane edge match one another based on the lane characteristics. The perception and map edge association system improves localization and scene creation performance.

18 Claims, 6 Drawing Sheets

PERCEPTION AND MAP EDGE ASSOCIATION SYSTEM FOR ACCOMMODATING INCONSISTENT PERCEPTION AND MAP DATA

INTRODUCTION

The present disclosure relates to a perception and map edge association system for an autonomous vehicle that accommodates inconsistent perception and map data.

An autonomous driving system for a vehicle is a complex system that includes many different aspects. For example, an autonomous driving system may include multiple sensors to gather perception data with respect to the vehicle's surrounding environment. In addition to the sensors, the autonomous driving system also utilizes map data as well. However, there are instances where poorly mapped data exists. Specifically, sometimes there may be inconsistent or inaccurate information existing within the map data, which creates a mismatch between the perception data collected by the sensors and the map data. For example, sometimes the map data may not include an accurate indication of the lane counts in a roadway or contains incorrect geometry. The map data may include missing or inaccurate information for a variety of reasons such as, for example, due to changes in the road network that have occurred since the map data was collected because of construction.

The autonomous driving system associates perception lane edges and map lane edges together based on a one-to-one relationship for localization and scene creation purposes. However, issues may arise when the autonomous driving system attempts to associate the perception lane edges and the map lane edges with one another because of missing, inaccurate, or inconsistent map data. Furthermore, it is to be appreciated that high-definition maps, which provide a level of detail of the vehicle's surrounding environment required for autonomous driving, may not always be available, which may also create issues when associating the perception lane edges with the map lane edges.

In addition to the above-mentioned challenges, global navigation satellite systems (GNSS) denied environments remain a challenge for perception-map association tasks. This is because a high uncertainty of a host pose on the map may cause misalignment between perception lane edges and the corresponding map lane edge candidates when projecting map lane edge candidates in the perception frame.

Thus, while autonomous driving systems achieve their intended purpose, there is a need in the art for determining an improved approach for associating perception lane edges with map lane edges.

SUMMARY

According to several aspects, a perception and map edge association system for an autonomous vehicle is disclosed, and includes one or more controllers executing instructions to receive a plurality of perception lane edge candidates that are each representative of a perception lane edges and a plurality of map lane edge candidates that are each representative of a map lane edge. The one or more controllers determine an association cost between each of the plurality of perception lane edge candidates and each of the plurality of map lane edge candidates for one or more lane characteristics. The one or more controllers generate a discrepancy flag in response to determining the association cost between one of the plurality of perception lane edge candidates and one of the plurality of map lane edge candidates is greater than a threshold cost amount. The one or more controllers determine a posterior association probability matrix between each of the plurality of perception lane edge candidates and the plurality of map lane edge candidates based on a current value of a recalculated likelihood of association, where the recalculated likelihood of association is an inverse of the association cost. The one or more controllers identify a discrepancy between a selected perception lane edge candidate and a best fit map lane edge candidate for one of the lane characteristics based on the posterior association probability matrix and the discrepancy flag, where the selected perception lane edge candidate and the best fit map lane edge candidate are a pair of inconsistent perception and map lane edges. The one or more controllers segment the pair of inconsistent perception and map lane edges into one or more matching segments, where the one or more matching segments indicate where the perception lane edge and the map lane edge match one another based on one of the lane characteristics.

In another aspect, the pair of inconsistent perception and map lane edges are identified based on the discrepancy flag being confirmed as valid.

In yet another aspect, the one or more controllers execute instructions to remove a remaining portion of the pair of inconsistent perception and map lane edges from the pair of inconsistent perception and map lane edges, invalidate the discrepancy flag corresponding to the pair of inconsistent perception and map lane edges, and transmit the matching segments that are part of the pair of inconsistent perception and map lane edges to a Kalman filter.

In an aspect, the one or more controllers execute instructions to receive, by the Kalman filter, GPS data indicating a position of the autonomous vehicle, a map-matching based pose estimate, and vehicle dynamics data, and estimate a host pose of the autonomous vehicle by fusing the GPS data, the map-matching based pose estimate, and the vehicle dynamics data together.

In another aspect, the map-matching based pose estimate is based on the matching segments of the pair of inconsistent perception and map lane edges.

In yet another aspect, the pair of inconsistent perception and map lane edges are segmented based on a dyadic decision tree that recursively segments the pair of inconsistent perception and map lane edges at respective midpoints.

In an aspect, the one or more controllers execute instructions to determine a translational error based on a likelihood of association, where the translational error is determined by:

$$\epsilon = \underset{\epsilon}{\mathrm{argmax}} \sum_i L_{p\hat{i}m\hat{j}}(\epsilon)$$

where $\epsilon$ is the translational error, $L_{pi\ m\hat{j}} = L_{pi\ m\hat{j}}^{pos*} L_{pi\ mj}^{type} * L_{pi\ mj}^{heading} * L_{pi\ mj}^{curvature}$ and $L_{pi\ mj}^{pos}$ refers to a likelihood of association based on position, $L_{pi\ mj}^{type}$ refers to the likelihood of association for either a type of lane line or a color of the lane line, $L_{pi\ mj}^{heading}$ refers to a likelihood of association based on a heading, and $L_{pi\ mj}^{curvature}$ refers to a likelihood of association based on curvature, and $\hat{j}$ is a nearest candidate map lane edge.

In another aspect, the nearest candidate map lane edge $\hat{j}$ is expressed as:

$$\hat{j} = \underset{j}{\mathrm{argmax}} L_{p\hat{i}mj}^{pos}(\epsilon)$$

In yet another aspect, the recalculated likelihood of association is based on the translational error.

In an aspect, the one or more controllers execute instructions to predict a predicted association probability matrix between each of the plurality of perception lane edge candidates and the plurality of map lane edge candidates based on a previously calculated association probability matrix at a previous timestep and a prior association probability at timestep zero, and determine the posterior association probability matrix at a current timestep between each of the plurality of perception lane edge candidates and the plurality of map lane edge candidates by updating the predicted association probability matrix with a current value of the likelihood of association at the current timestep.

In an aspect, the posterior association probability matrix is determined based on:

$$q_{pm}^t = k q_{pm}^{t-} l_{pm}^t$$

where $q_{pm}^t$ represents the posterior association probability matrix, k represents a normalizing constant, $q_{pm}^{t-}$ represents the predicted association probability matrix, and $l_{pm}^t$ represents a current value of the likelihood of association.

In another aspect, the one or more lane characteristics refers to one or more of the following: a distance, a type of lane line, a heading, and a curvature between a perception lane edge and a map lane edge.

In yet another aspect, the threshold cost amount is selected to indicate a discrepancy between the perception lane edge candidate and the map lane edge candidate based on one of the lane characteristics.

In an aspect, a perception and map edge association system for an autonomous vehicle is disclosed and includes one or more controllers executing instructions to receive a plurality of perception lane edge candidates that are each representative of a perception lane edges and a plurality of map lane edge candidates that are each representative of a map lane edge. The one or more controllers determine an association cost between each of the plurality of perception lane edge candidates and each of the plurality of map lane edge candidates for one or more lane characteristics. The one or more controllers generate a discrepancy flag in response to determining the association cost between one of the plurality of perception lane edge candidates and one of the plurality of map lane edge candidates is greater than a threshold cost amount. The one or more controllers determine a posterior association probability matrix between each of the plurality of perception lane edge candidates and the plurality of map lane edge candidates based on a current value of a recalculated likelihood of association, where the recalculated likelihood of association is an inverse of the association cost. The one or more controllers identify a discrepancy between a selected perception lane edge candidate and a best fit map lane edge candidate for one of the lane characteristics based on the posterior association probability matrix and the discrepancy flag, where the selected perception lane edge candidate and the best fit edge candidate are a pair of inconsistent perception and map lane edges. Finally, the one or more controllers segment the pair of inconsistent perception and map lane edges into one or more matching segments, where the one or more matching segments indicate where the perception lane edge and the map lane edge match one another based on one of the lane characteristics. The pair of inconsistent perception and map lane edges are segmented based on a dyadic decision tree that recursively segments the pair of inconsistent perception and map lane edges at respective midpoints.

In yet another aspect, the pair of inconsistent perception and map lane edges are identified based on the discrepancy flag being confirmed as valid.

In an aspect, the one or more controllers execute instructions to remove a remaining portion of the pair of inconsistent perception and map lane edges from the pair of inconsistent perception and map lane edges, invalidate the discrepancy flag corresponding to the pair of inconsistent perception and map lane edges, and transmit the matching segments that are part of the pair of inconsistent perception and map lane edges to a Kalman filter.

In another aspect, the one or more controllers execute instructions to receive, by the Kalman filter, GPS data indicating a position of the autonomous vehicle, a map-matching based pose estimate, and vehicle dynamics data, and estimate a host pose of the autonomous vehicle by fusing the GPS data, the map-matching based pose estimate, and the vehicle dynamics data together.

In yet another aspect, the one or more controllers execute instructions to determine a translational error based on a likelihood of association, wherein the translational error is determined by:

$$\epsilon = \underset{\epsilon}{\mathrm{argmax}} \sum_i L_{pim\hat{j}}(\epsilon)$$

where $\epsilon$ is the translational error, $L_{pi\ m\hat{j}} = L_{pi\ mj}^{pos*} L_{pi\ mj}^{type} * L_{pi\ mj}^{heading} * L_{pi\ mj}^{curvature}$ and $L_{pi\ mj}^{pos}$ refers to a likelihood of association based on position, $L_{pi\ mj}^{type}$ refers to the likelihood of association for either a type of lane line or a color of the lane line, heading refers to a likelihood of association based on a heading, and $L_{pi\ mj}^{curvature}$ refers to a likelihood of association based on curvature, and $\hat{j}$ is a nearest candidate map lane edge.

In an aspect, the recalculated likelihood of association is based on the translational error.

In another aspect, a perception and map edge association system for an autonomous vehicle is disclosed and includes one or more controllers executing instructions to receive a plurality of perception lane edge candidates that are each representative of a perception lane edges and a plurality of map lane edge candidates that are each representative of a map lane edge. The one or more controllers determine an association cost between each of the plurality of perception lane edge candidates and each of the plurality of map lane edge candidates for one or more lane characteristics. The one or more controllers generate a discrepancy flag in response to determining the association cost between one of the plurality of perception lane edge candidates and one of the plurality of map lane edge candidates is greater than a threshold cost amount. The one or more controllers determine a posterior association probability matrix between each of the plurality of perception lane edge candidates and the plurality of map lane edge candidates based on a current value of a recalculated likelihood of association, where the recalculated likelihood of association is an inverse of the association cost. The one or more controllers identify a discrepancy between a selected perception lane edge candidate and a best fit map lane edge candidate for one of the lane characteristics based on the posterior association probability matrix and the discrepancy flag, where the selected perception lane edge candidate and the best fit map lane edge candidate are a pair of inconsistent perception and map lane edges. The one or more controllers segment the pair of inconsistent perception and map lane edges into one or more matching segments, where the one or more matching segments indicate where the perception lane edge and the map lane edge match one another based on one of the lane characteristics, and the pair of inconsistent perception and map lane edges are segmented based on a dyadic decision tree that recursively segments the pair of inconsistent perception and map lane edges at respective midpoints. The one or more controllers remove a remaining portion of the pair of inconsistent perception and map lane edges from the pair of inconsistent perception and map lane edges, where the pair of inconsistent perception and map lane edges are identified based on the discrepancy flag being confirmed as valid. The one or more controllers invalidate the discrepancy flag corresponding to the pair of inconsistent perception and map lane edges. The one or more controllers transmit the matching segments that are part of the pair of inconsistent perception and map lane edges to a Kalman filter. The one or more controllers receive, by the Kalman filter, GPS data indicating a position of the autonomous vehicle, a map-matching based pose estimate, and vehicle dynamics data. The one or more controllers estimate a host pose of the autonomous vehicle by fusing the GPS data, the map-matching based pose estimate, and the vehicle dynamics data together, where the map-matching based pose estimate is based on the matching segments of the pair of inconsistent perception and map lane edges.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
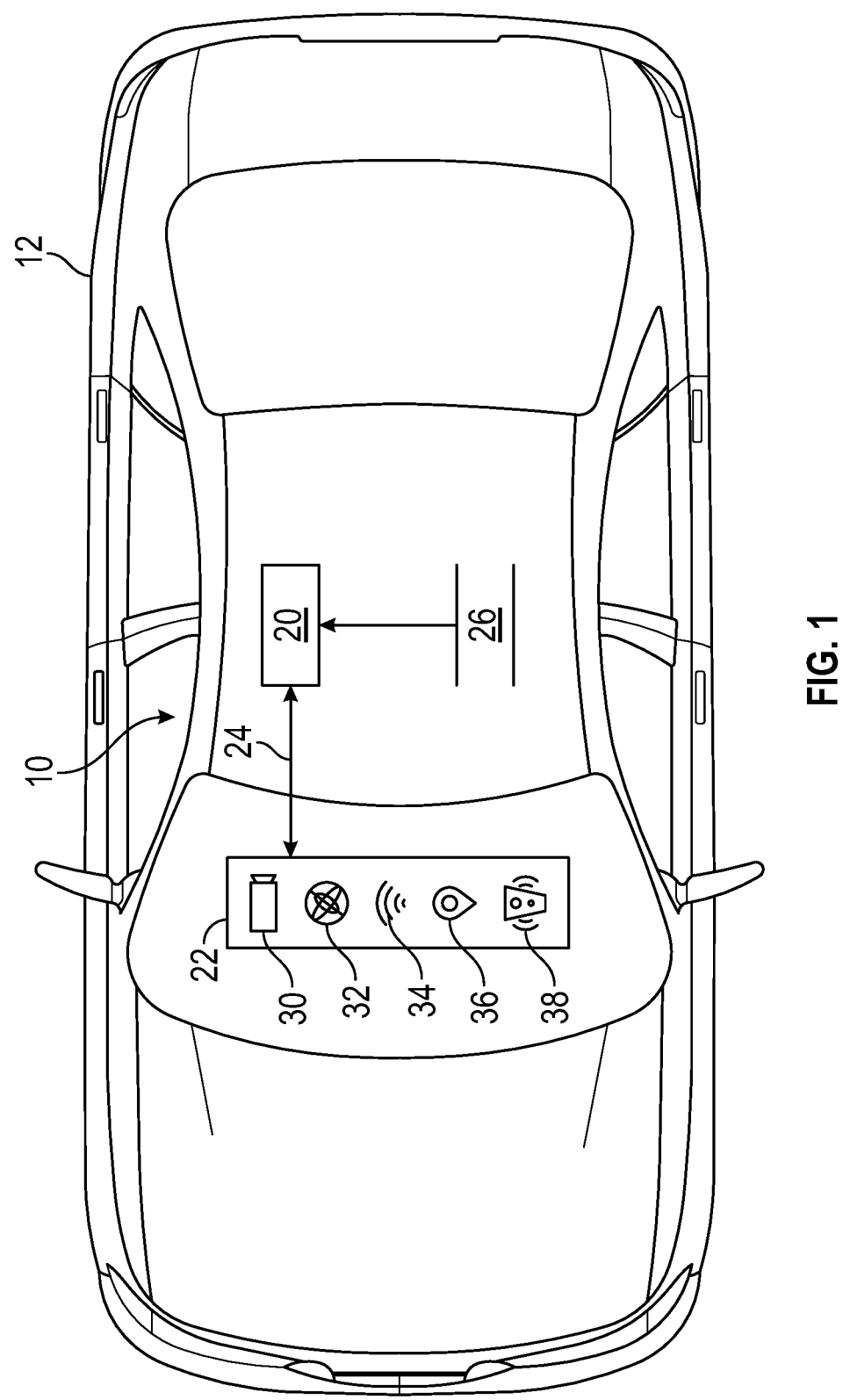
FIG. 1 is a schematic diagram of a vehicle including the disclosed perception and map edge association system, where the perception and map edge association system includes one or more controllers, according to an exemplary embodiment.

Referring to FIG. 1, an exemplary perception and map edge association system 10 for an autonomous vehicle 12 is illustrated. It is to be appreciated that the autonomous vehicle 12 may be any type of vehicle such as, but not limited to, a sedan, truck, sport utility vehicle, van, or motor home. The autonomous vehicle 12 may be a fully autonomous vehicle including an automated driving system (ADS) for performing all driving tasks or a semi-autonomous vehicle including an advanced driver assistance system (ADAS) for assisting a driver with steering, braking, and/or accelerating.

The perception and map edge association system 10 includes one or more controllers 20 in electronic communication with a plurality of sensors 22 configured to collect perception data 24 indicative of an environment surrounding the autonomous vehicle 12. In the non-limiting embodiment as shown in FIG. 1, the plurality of sensors 22 include one or more cameras 30, an inertial measurement unit (IMU) 32, a global positioning system (GPS) 34, radar 36, and LIDAR 38, however, is to be appreciated that additional sensors may be used as well. In addition to receiving the perception data 24 from the plurality of sensors 22, the one or more controllers 20 also receives map data 26 as well.

Figure 2:
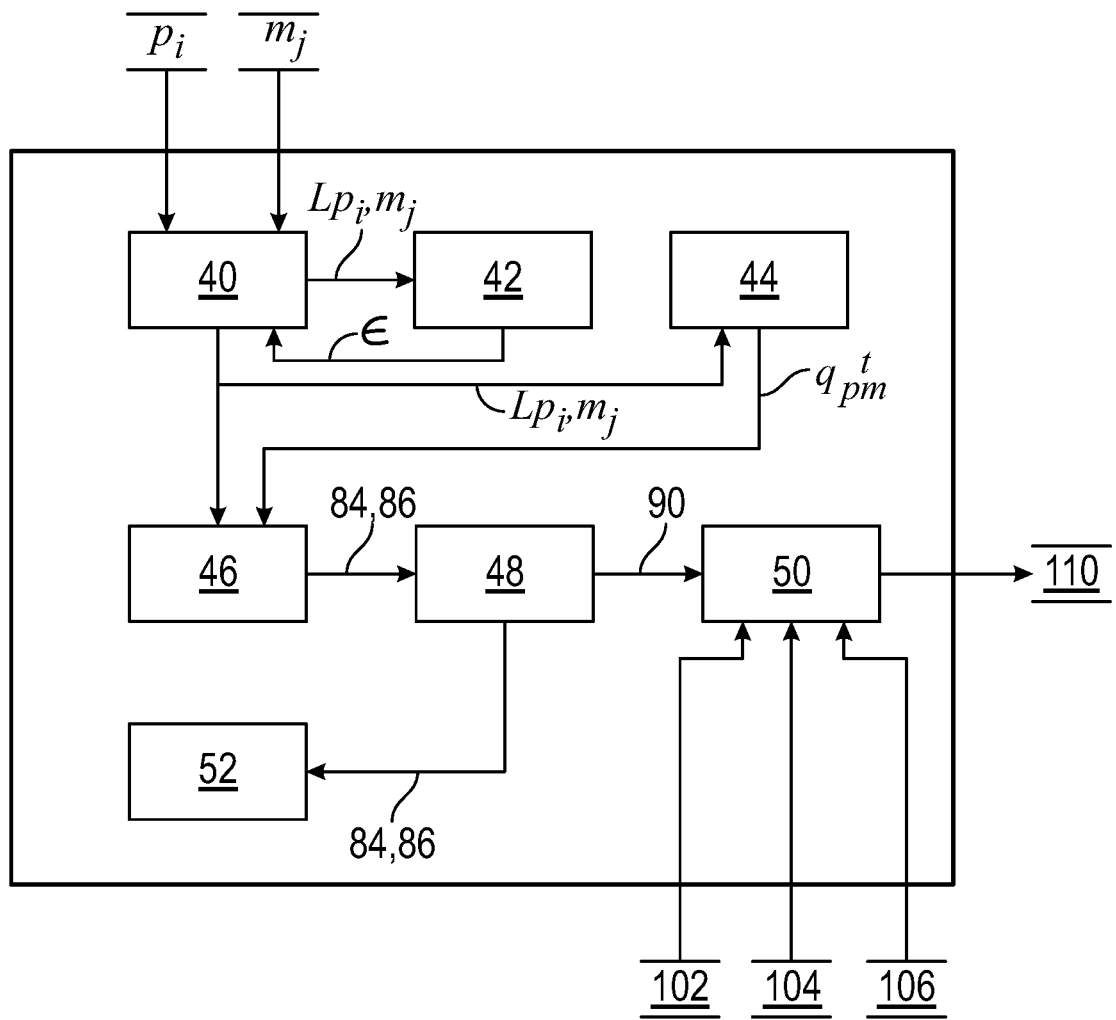
FIG. 2 is a block diagram of the one or more controllers shown in FIG. 1, according to an exemplary embodiment.
Figure 3:
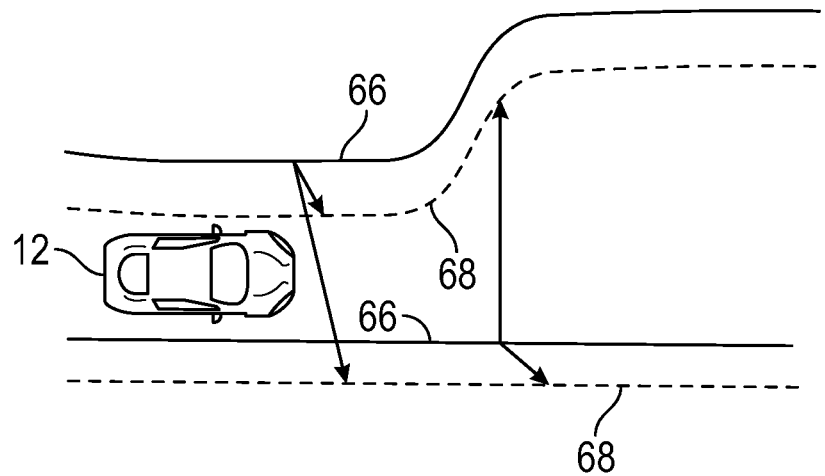
FIG. 3 is a diagram illustrating perception lane edges and map lane edges, according to an exemplary embodiment.

FIG. 2 is a block diagram of the one or more controllers 20 of the perception and map edge association system 10 shown in FIG. 1. The one or more controllers 20 include a cost matrix block 40, a coarse translational alignment block 42, a predict and update block 44, an association block 46, a segmentation block 48, a localization block 50, and a scene creator 52. FIG. 3 is diagram illustrating an exemplary plurality of perception lane edges 66 that are determined based on the perception data 24 collected by the plurality of sensors 22 (FIG. 1) and a plurality of map lane edges 68 that are determined based on the map data 26 (FIG. 1).

Referring to both FIGS. 2 and 3, the one or more controllers 20 receives a plurality of perception lane edge candidates pi that are representative of the perception lane edges 66 and a plurality of map lane edge candidates mj that are representative of the map lane edges 68 as input. The cost matrix block 40 of the one or more controllers 20 determines an association cost $c_{pi\ mj}$ between each of the perception lane edge candidates pi and each of the map lane edge candidates mj for one or more lane characteristics. The one or more lane characteristics refers to a distance, a type of lane line, a heading, and a curvature between a perception lane edge 66 and/or a map lane edge 68. In one embodiment, the type of lane line indicates either a dashed line or a solid line. The type of lane line may also refer to a color of the lane lines. For example, the color of the lane lines may be yellow or white. The association cost $c_{pi\ mj}$ is determined based on a weighted cost function and is expressed in Equation 1 as:

$$c_{pimj} = \sum_k w^k c_{ij}^k \qquad \text{Equation 1}$$

where $c_{ij}^k \in c_{ij\ distance}, c_{ij\ type}, c_{ij\ heading}, c_{ij\ curvature}, c_{ij}^k$ refers to an association cost between an ith perceived lane edge and a jth map lane edge for a similarity measure, $c_{ij\ distance}$ refers to the association cost for distance, $c_{ij\ type}$ refers to the association cost for either the type of lane line or the color of the lane line, $c_{ij\ heading}$ refers to the association cost for heading, $c_{ij\ curvature}$ refers to the association cost for curvature, and $w^k$ refers to a weighting constant. A likelihood of association $L_{pi\ mj}$ is inversely proportional to the association cost $c_{pi\ mj}$, or $c_{pi\ mj} = -\ln L_{pi\ mj}$. The association cost $c_{ij}^k$ is calculated based on the average Mahalanobis distance between all perception lane edge candidates pi of the perception lane edge 66 and their corresponding nearest neighbor map lane edge candidates mj of the map lane edge 68.

The cost matrix block 40 generates a discrepancy flag 54 (shown in FIG. 5C) in response to determining the association cost $c_{pi\ mj}$ between one of the perception lane edge candidates pi and one of the map lane edge candidates mj is greater than a threshold cost amount. The threshold cost amount is selected to indicate a discrepancy between the perception lane edge candidate pi and the map lane edge candidate mj for one or more of the lane characteristics (distance, type of lane line, heading, and curvature). The discrepancy indicates that the perception lane edge candidate pi does not follow or match the map lane edge candidate mj for each of the lane characteristics. The discrepancy may be created by missing or inaccurate information existing within the map data 26 (FIG. 1) and creates a mismatch or discrepancy between the perception data 24 collected by the sensors 22 and the map data 26, which is then identified by the discrepancy flag 54.

Figure 5A:
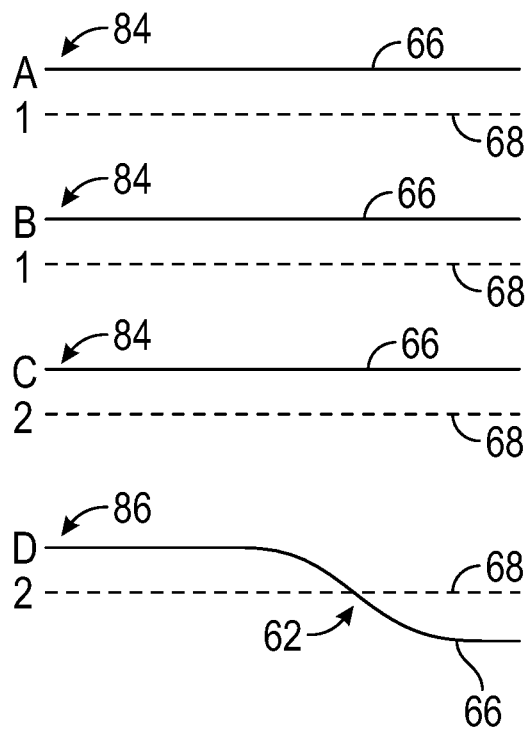
FIG. 5A is a diagram of four perception lane edges and two map lane edges, according to an exemplary embodiment.
Figure 5B:
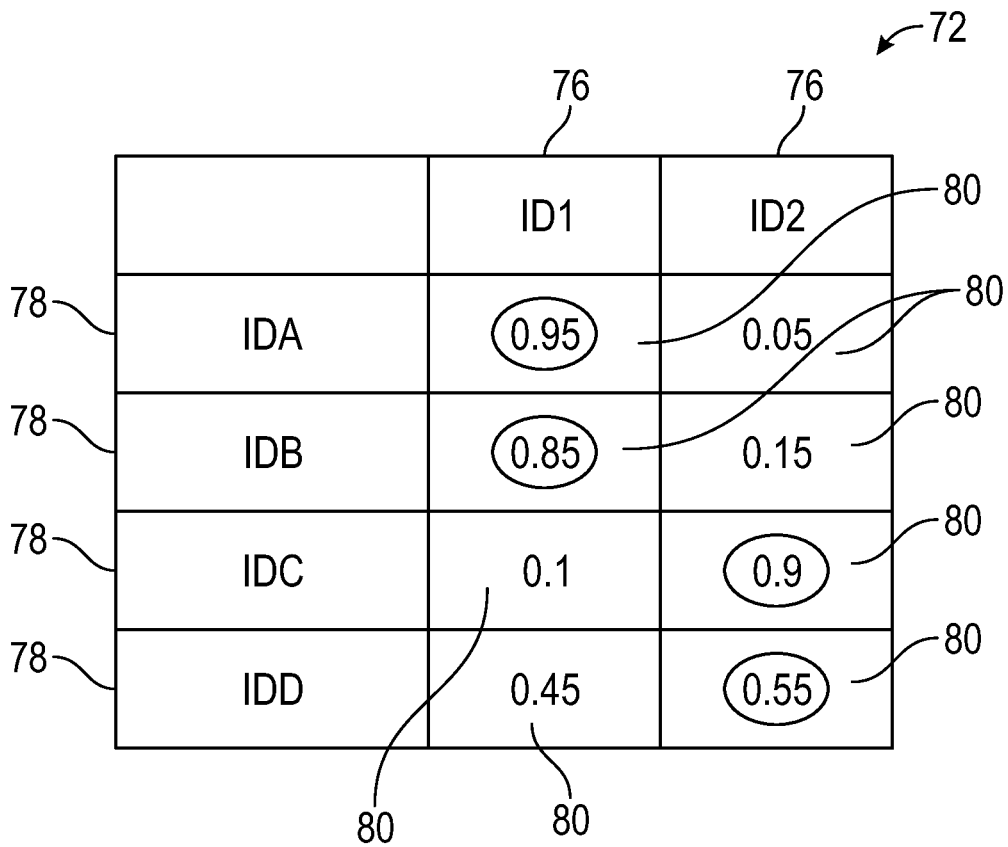
FIG. 5B illustrates an exemplary association table matrix corresponding to the diagram in FIG. 5A, according to an exemplary embodiment.
Figure 5C:
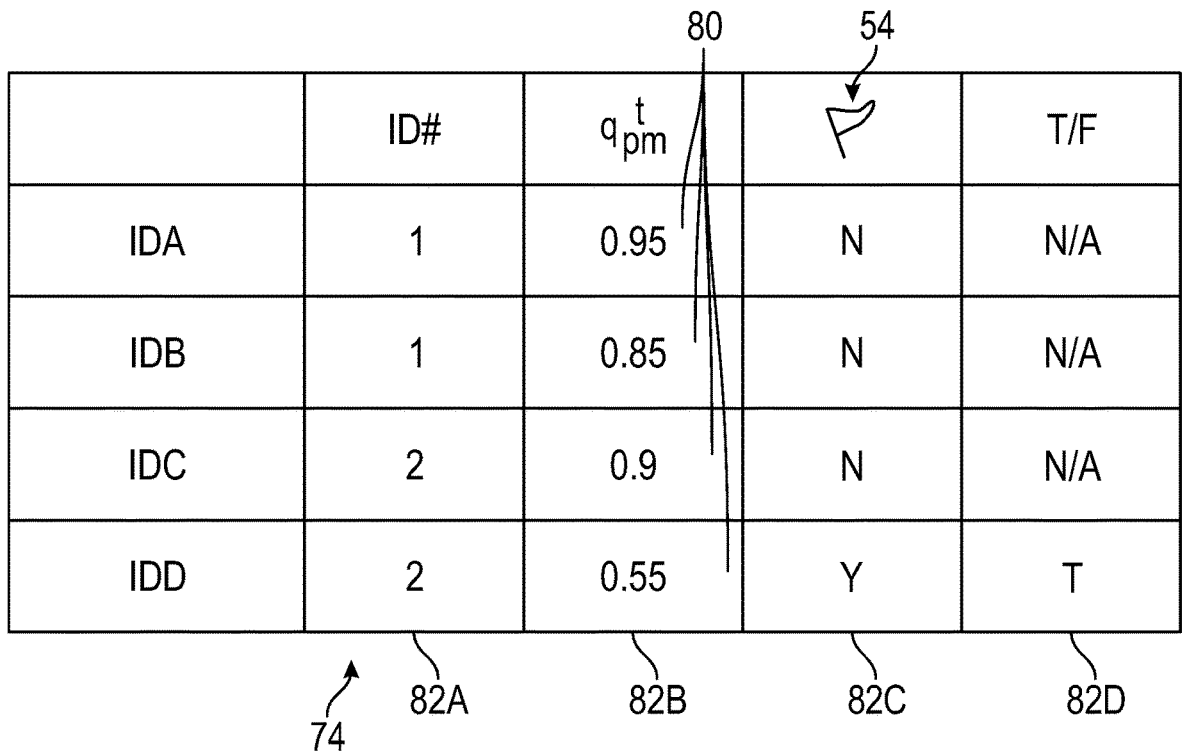
FIG. 5C illustrates an exemplary non-maximum suppression table corresponding to the diagram in FIG. 5A, according to an exemplary embodiment.

For example, as seen in FIGS. 5A-5C, the cost matrix block 40 generates a discrepancy flag 54 in response to determining the association cost $c_{pi\ mj}$ between the perception lane edge candidate D and the map lane edge candidate 2 based on the lane characteristics of distance, heading, and curvature, since the perception lane edge candidate D diverges at area 62 from the map lane edge 68. The threshold cost amount is calculated offline based on receiver operating characteristic (ROC) curves to maximize a probability of detecting discrepancies, while at the same time minimizing the occurrence of false discrepancy detections based on trained perception lane edge data and map lane edge data.

Figure 4:
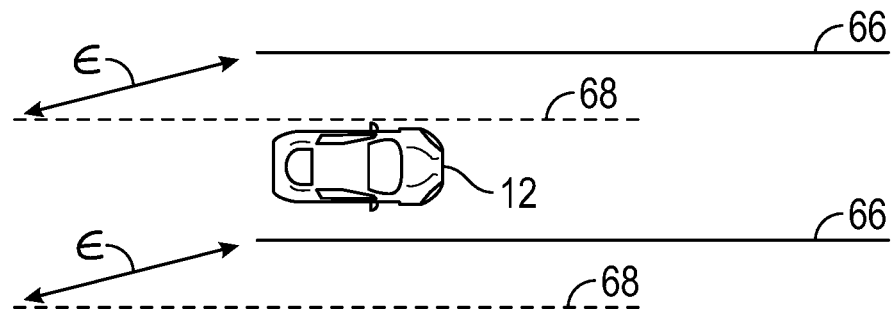
FIG. 4 is a diagram illustrating a translational error between the perception lane edges and the map lane edges, according to an exemplary embodiment.

FIG. 4 is a diagram illustrating a translational error E between the perception lane edges 66 and the map lane edges 68. The translational error E is created by host pose error and map lane bias. The host pose error occurs most often in global navigation satellite system (GNSS) denied environments, while map lane bias is caused when high-definition map data is unavailable. The translational error $\epsilon$ provides coarse translational alignment between the perception lane edge candidates pi and the nearest map lane edge candidate mj to account for the host pose error and map lane bias.

Referring to FIGS. 2 and 4, the coarse translational alignment block 42 of the one or more controllers 20 determines the translational error E based on the likelihood of association $L_{pi\ mj}$. The coarse translational alignment block 42 estimates the translational error E to align the map lane edges 68, which are expressed in the global coordinate frame, with the perception lane edges 66. The perception lane edges 66 are expressed in the ego reference frame of the autonomous vehicle 12. The translational error $\epsilon$ is expressed in Equation 2:

$$m_{global} = Rm_{ego} + h_{global} + \epsilon \qquad \text{Equation 2}$$

where $m_{global}$ represents the map lane edges 68 in the global coordinate frame, R represents a rotational matrix that maps the map lane edges 68 from the ego reference frame to the global coordinate frame, $m_{ego}$ represents the map lane edges 68 in the ego reference frame, $h_{global}$ represents the vehicle host pose, and the translational error E is estimated based on a covariance $\Sigma$, or $\epsilon \sim N(0,\Sigma)$ where $\Sigma = \Sigma_{host} + \Sigma_{map\ bias}$, or the covariance $\Sigma$ is equal to the sum of the host covariance $\Sigma_{host}$ and the map data covariance $\Sigma_{map\ bias}$. The translational error $\epsilon$ is then estimated to maximize an overall association likelihood between all perception lane edges 66 and a nearest candidate map lane edge $\hat{j}$ having the lowest position cost based on a coarse grid search bounded by the covariance $\Sigma$, and is expressed in Equation 3 as:

$$\epsilon = \underset{\epsilon}{\operatorname{argmax}} \sum_i L_{pim\hat{j}}(\epsilon) \qquad \text{Equation 3}$$

where $L_{pi\ m\hat{j}} = L_{pi\ mj}^{pos} * L_{pi\ mj}^{type} * L_{pi\ mj}^{heading} * L_{pi\ mj}^{curvature}$ and refers to the likelihood of association based on the position, $L_{pi\ mj}^{type}$ refers to the likelihood of association for either the type of lane line or the color of the lane line, $L_{pi\ mj}^{heading}$ refers to the likelihood of association based on the heading, and $L_{pi\ mj}^{curvature}$ refers to the likelihood of association based on curvature, and the nearest candidate map lane edge $\hat{j}$ is expressed in Equation 4 as:

$$\hat{j} = \underset{j}{\operatorname{argmax}} L_{pimj}^{pos}(\epsilon) \qquad \text{Equation 4}$$

Once the translational error $\epsilon$ is calculated, the coarse translational alignment block 42 determines a recalculated likelihood of association $L_{pi\ mj}$ based on Equation 3, and the recalculated likelihood of association $L_{pi\ mj}$ is then sent to the predict and update block 44, unless the recalculated likelihood of association $L_{pi\ mj}$ is a first-time calculation. In the event the recalculated likelihood of association $L_{pi\ mj}$ is a first-time calculation, the recalculated likelihood of association $L_{pi\ mj}$ is then transmitted to the association block 46.

Referring to FIG. 2, the predict and update block 44 of the one or more controllers 20 receives the recalculated likelihood of association $L_{pi\ mj}$, which is based on the association cost $c_{pi\ mj}$ between one of the perception lane edge candidates pi and one of the map lane edge candidates mj and the translational error E. The predict and update block 44 includes two stages, namely, a prediction stage and an update stage. The prediction stage of the predict and update block 44 determines a predicted association probability matrix $q_{pm}^{t-}$ between each of the perception lane edge candidates $p_i$ and the map lane edge candidates mj, and is based on previous association information that has not been affected by current association measurements. The predicted association probability matrix $q_{pm}^{t-}$ is predicted based on a previously calculated association probability matrix $q_{pm}^{t-1}$ at a previous timestep t−1, which is referred to as a posterior association probability matrix $q_{pm}^t$, and a prior association probability $q_{pm}^0$ at timestep zero.

The predicted association probability matrix $q_{pm}^{t-}$ is determined based on Equation 5, which is:

$$q_{pm}^{t-} = k q_{pm}^{t-1} \frac{q_{pm}^0 + \alpha}{q_{pm}^{t-1} + \alpha} \quad \text{Equation 5}$$

where k is a normalizing constant that ensures that a sum of the predicted association probability matrix $q_{pm}^{t-}$ between the perception lane edge candidate $p_i$ and a corresponding map lane edge candidate $m_j$ are equal to 1 and a is a tuning parameter. As the tuning parameter a approaches zero ($\alpha \to 0$) the predicted association probability matrix $q_{pm}^{t-}$ converges to the previous association probability matrix $q_{pm}^{t-1}$, which means that a maximum weight of prediction is based on the most recent associations. Alternatively, when the tuning parameter a approaches infinity ($\alpha \to \infty$) the predicted association probability matrix $q_{pm}^{t-}$ is not based on tracking the previous association probability matrix $q_{pm}^{t-1}$. Instead, the previous association probability matrix $q_{pm}^{t-1}$ converges to the prior association probability $q_{pm}^0$.

The update stage of the predict and update block 44 of the one or more controllers 20 then determines the posterior association probability matrix $q_{pm}^t$ at the current timestep t between the perception lane edge candidate $p_i$ and the map lane edge candidate $m_j$ by updating the predicted association probability matrix $q_{pm}^{t-}$ with a current value of the likelihood of association $l_{pm}^t$ at the current timestep t, and is determined by Equation 6 as:

$$q_{pm}^t = k q_{pm}^{t-} l_{pm}^t \quad \text{Equation 6}$$

The posterior association probability matrix $q_{pm}^t$ at the current timestep t is then sent to the association block 46. For each perception lane edge candidate pi, the association block 46 selects a best fit map lane edge candidate $\hat{m}$ based on a maximum value of the predicted association probability matrix $q_{pm}^{t-}$, and is expressed in Equation 7 as:

$$\hat{m} = \underset{m}{\operatorname{argmax}} q_{pm}^t \quad \text{Equation 7}$$

It is to be appreciated that Equation 7 suppresses all non-maximum probabilities and selects the map lane edge candidate $m_j$ having the maximum value of the predicted association probability matrix $q_{pm}^{t-}$. The maximum value of the predicted association probability matrix $q_{pm}^{t-}$ corresponding to the best fit map lane edge candidate $\hat{m}$ is forwarded to the segmentation block 48 as well. The maximum value of the predicted association probability matrix $q_{pm}^{t-}$ represents the confidence of association between a matched pair that includes the perception lane edge candidate pi and the best fit map lane edge candidate $\hat{m}$. As explained above, the cost matrix block 40 generates the discrepancy flag 54 (shown in FIG. 5C) based on the threshold cost amount. As explained below, if the discrepancy flag 54 is identified as being invalid (i.e., the discrepancy flag 54 is set to false), then the best fit map lane edge candidate $\hat{m}$ is consistent with the perception lane edge candidate pi that is under consideration. However, if the discrepancy flag 54 confirmed as being valid (i.e., the discrepancy flag 54 is set to true, which is shown in column 82D as a "T") then a discrepancy between the best fit map lane edge candidate $\hat{m}$ and the perception lane edge candidate pi that is under consideration is detected.

FIG. 5A illustrates four perception lane edge candidates A, B, C, D, and two map lane edge candidates 1 and 2. FIG. 5B illustrates an exemplary association table matrix 72 summarizing values of the posterior association probability matrix $q_{pm}^t$ between each of the perception lane edge candidates A, B, C, D and the map lane edge candidates 1 and 2. FIG. 5C illustrates an exemplary non-maximum suppression table 74, where non-maximum posterior association probability matrix $q_{pm}^t$ values between the perception lane edge candidates A, B, C, D and the map lane edge candidates 1 and 2 are suppressed.

Referring to FIG. 5A, each perception lane edge candidate pi is paired independently with the best fit map lane edge candidate $\hat{m}$ to create a pair of consistent perception and map lane edges 84. For example, perception lane edge candidates A and B is paired with map lane edge candidate 1, where the map lane edge candidate 1 is identified as the best fit map lane edge candidate $\hat{m}$. Similarly, the perception lane edge candidates C and D are paired with map lane edge candidate 2. However, although the map lane edge candidate 2 is identified as the best fit corresponding to the perception lane edge candidate D, the discrepancy flag 54 (FIG. 5C) is generated by the cost matrix block 40 (FIG. 2). This is because the perception lane edge candidate D diverges from the map lane edge candidate 2 at area 62. As explained below, the association block 46 confirms the discrepancy flag 54 generated with respect to a selected perception lane edge candidate D and a selected map lane edge candidate 2 that create a pair of inconsistent perception and map lane edges 86, where the discrepancy flag 54 indicates a discrepancy for one or more of the lane characteristics (distance, type of lane line, heading, and curvature) between the perception lane edge candidate pi and the best fit map lane edge candidate $\hat{m}$ for a pair of inconsistent perception and map lane edges 86. Referring to FIG. 5B, the association table matrix 72 includes a plurality of columns 76 corresponding to one of the map lane edge candidates 1 and 2, and a plurality of rows 78 corresponding to one of the perception lane edge candidates A, B, C, and D. The association table matrix 72 lists a corresponding posterior association probability matrix value 80 between each perception lane edge candidate A, B, C, D and each map lane edge candidate 1 and 2.

For example, referring to FIGS. 5A and 5B, the posterior association probability matrix value 80 between perception lane edge candidate A and map lane edge candidate 1 is 0.95, and the posterior association probability matrix value 80 between perception lane edge candidate A and map lane edge candidate 2 is 0.05, which indicates a high correlation between the perception lane edge candidate A and map lane edge candidate 1. In contrast, the posterior association probability matrix value 80 between the selected perception lane edge candidate D and map lane edge candidate 1 is 0.45, and the posterior association probability matrix value 80 between the selected perception lane edge candidate D and the selected map lane edge candidate 2 is 0.55. As seen in FIG. 5A, the perception lane edge candidate D diverges in position, heading, and curvature from the map lane edge candidate 2 at the area 62, which explains the relatively low correlation. As mentioned above, the discrepancy flag 54 (FIG. 5C) was generated by the cost matrix block 40 (FIG. 2) with respect to the perception lane edge candidate D and the map lane edge candidate 2.

Referring specifically to FIG. 5C, the non-maximum suppression table 74 includes a first column 82A that identifies the map lane edge candidate mj having the maximum posterior association probability matrix value 80 for all the map lane edge candidates mj considered for a specific perception lane edge pi. The non-maximum suppression table 74 includes a second column 82B indicating the actual value of the posterior association probability matrix value 80 of the map lane edge candidate mj in column 82A. The non-maximum suppression table 74 includes a third column 82C indicating when the discrepancy flag 54 is generated by the cost matrix block 40 (FIG. 2), where "N" indicates the discrepancy flag 54 was not set, and "Y" indicates the discrepancy flag 54 was set. The non-maximum suppression table 74 includes a fourth column 82D indicating if the discrepancy flag 54 is set to true (indicated by a "T") or false (indicated by an "F") based on an analysis performed by the association block 46, which is described below.

For each perception lane edge 66 of the non-maximum suppression table 74, the association block 46 compares the maximum posterior association probability matrix value 80 with a threshold association value to determine the validity of the discrepancy flag 54 generated by the cost matrix block 40 (FIG. 2). The threshold association value of the maximum posterior association probability matrix value 80 is selected to confirm the discrepancy between the best fit map lane edge candidate m̂ and the perception lane edge candidate pi that is under consideration. In response to determining the maximum posterior association probability matrix value 80 is equal to or greater than the threshold association value, the association block 46 sets the discrepancy flag 54, if applicable, to true (column 82D), thereby confirming the discrepancy flag 54 is valid. Otherwise, the discrepancy flag 54 is set to false, thereby indicating the discrepancy flag 54 is invalid.

Figure 6:
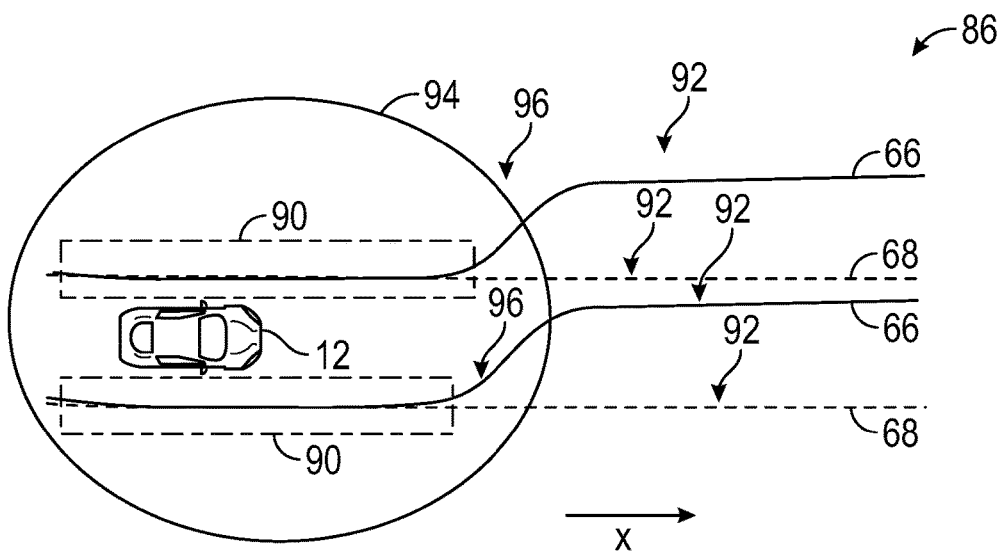
FIG. 6 illustrates one approach to segment a pair of inconsistent pair of perception and map lane edges based on an adaptive forward window, according to an exemplary embodiment.

Referring to FIGS. 2, 5A, 5C, and 6, the association block 46 transmits the pairs of consistent perception and map lane edges 84 and pairs of inconsistent perception and map lane edges 86 to the segmentation block 48. As explained below, the segmentation block 48 identifies inconsistent portions of the pairs of inconsistent perception and map lane edges 86 that are inconsistent with respect to one another based on the lane characteristics (e.g., distance, type of lane line, heading, and curvature), and differentiates the inconsistent portions from consistent portions of the pairs of inconsistent perception and map lane edges 86, where the consistent portions are referred to as matching segments 90 (seen in FIG. 6). Merely by way of example, as seen in FIG. 6, completely disregarding the matching segments 90 of the pair of inconsistent perception and map lane edges 86 may waste information that may be valuable when creating a scene by the scene creator 52, since the pair of inconsistent perception and map lane edges 86 remain consistent with one another before area 62.

Referring to FIGS. 2 and 6, the segmentation block 48 segments the pair of inconsistent perception and map lane edges 86 into the one or more matching segments 90. The matching segments 90 indicate where the perception lane edge 66 and the map lane edge 68 match one another based on one of the lane characteristics. For example, as seen in FIG. 6, the perception lane edge 66 and the map lane edge 68 match one another based on distance. After identifying the matching segments 90, the segmentation block 48 removes a remaining portion 92 of the inconsistent perception and map lane edges 86 and resets the discrepancy flag 54 (FIG. 5C) to false. The segmentation block 48 then transmits the matching segments 90 of the inconsistent perception and map lane edges 86, which include an invalided discrepancy flag 54, to the localization block 50 and the scene creator 52. It is to be appreciated that the localization block 50 only localizes pairs of perception and map lane edges 84, 86 having a discrepancy flag 54 that is invalid (i.e., set to false). Furthermore, the scene creator 52 builds a scene of the environment surrounding the autonomous vehicle 12 by only fusing together pairs of perception and map lane edges 84, 86 that are consistent with one another (i.e., a discrepancy flag 54 set to false) when building the scene.

In one embodiment, the segmentation block 48 segments the pair of inconsistent perception and map lane edges 86 based on an adaptive forward window 94, which is shown in FIG. 6. The forward window 94 starts at a horizontal position of zero (x=0), and travels in a horizontal or x-direction, which is referred to as ego forward. As the forward window 94 travels in the x-direction, segmentation block 48 determines the association cost for the perception lane edge 66 and the map lane edge 68 for the pair of inconsistent perception and map lane edges 86 at a given point. The segmentation block 48 compares the association cost of the pair of inconsistent perception and map lane edges 86 at the given point with the threshold cost amount. In response to determining the association cost of the pair of inconsistent perception and map lane edges 86 at the given point is less than the threshold cost amount, the forward window 94 continues to travel in the x-direction and determine the association cost of the pair of inconsistent perception and map lane edges 86 at a subsequent point. However, as shown in FIG. 6, the perception lane edge 66 and the map lane edge 68 diverge from one another at the area 96, and therefore the association cost is greater than the threshold cost amount. In response to determining the association cost for the perception lane edge 66 and the map lane edge 68 for the pair of inconsistent perception and map lane edges 86 is greater than the threshold cost amount, the segmentation block 48 terminates the matching segment 90, removes the remaining portion 92 of the pair of inconsistent perception and map lane edges 86, and invalidates or resets the discrepancy flag 54 (FIG. 5C) to a false value. The segmentation block 48 then transmits the matching segments 90 of the inconsistent perception and map lane edges 86, which include the invalided discrepancy flag 54, to the localization block 50 and the scene creator 52.

Figure 7:
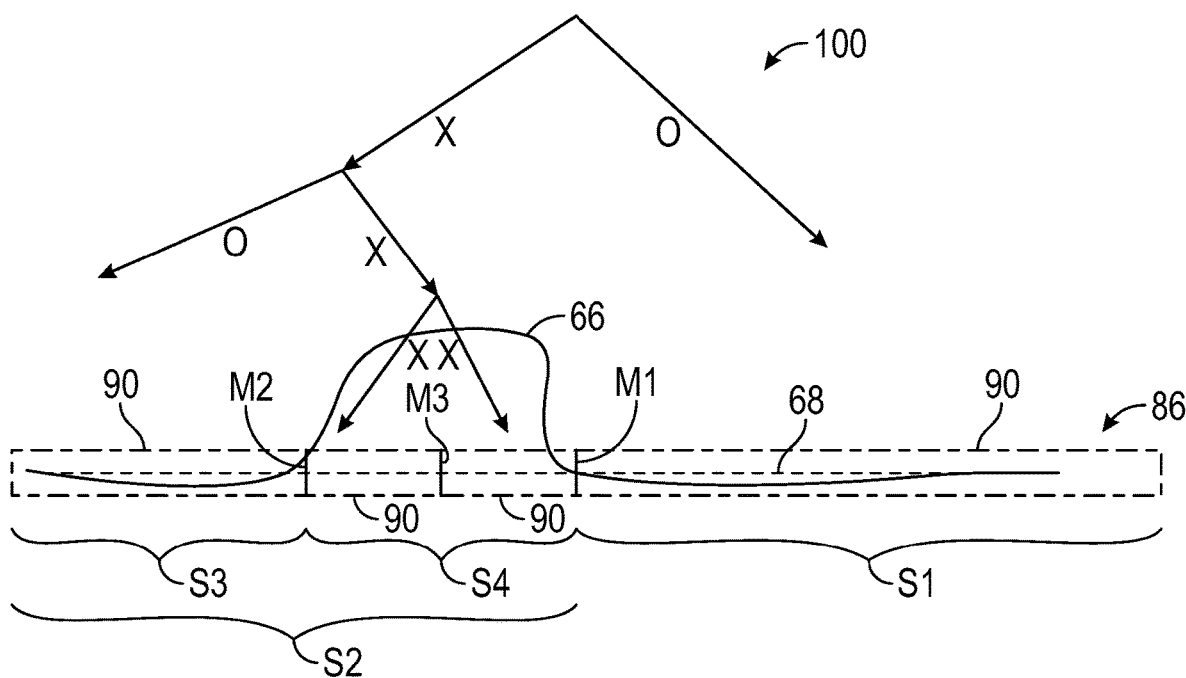
FIG. 7 illustrates another approach to segment the pair of inconsistent perception and map lane edges based on a dyadic decision tree, according to an exemplary embodiment.

In another embodiment, the segmentation block 48 segments the pair of inconsistent perception and map lane edges 86 based on a dyadic decision tree 100, which is illustrated in FIG. 7. As seen in FIG. 7, the dyadic decision tree 100 recursively segments the pair of inconsistent perception and map lane edges 86 at respective midpoints. Specifically, the dyadic decision tree 100 first segments the pair of inconsistent perception and map lane edges 86 at a first midpoint M1 to create two equal segments S1 and S2. The segment block 48 identifies one of the equal segments S1 as the matching segment 90, which is indicated by an "O" in the dyadic decision tree 100. The remaining equal segment S2 includes a mismatch between the perception lane edge 66 and the map lane edge 68, and therefore is marked with an "X" in the dyadic decision tree 100.

The remaining equal segment S2 is then segmented at a second midpoint M2 to create two subsequent equal segments S3 and S4. The second midpoint M2 is the midpoint of the remaining equal segment S2. The segment block 48 identifies one of the equal subsequent segments S3 as the matching segment 90 and then segments a remaining equal subsequent segment S4 and a third midpoint M3. The dyadic decision tree 100 continues to segment the pair of inconsistent perception and map lane edges 86 until the subsequent segments contain no matching segments 90, or until the inconsistent perception and map lane edges 86 are segmented into a minimum length. For example, in one embodiment, the dyadic decision tree 100 may continue to segment the pair of inconsistent perception and map lane edges 86 until the subsequent segments include a minimum length of twenty-five meters or less.

Referring to FIG. 2, the localization block 50 includes a Kalman filter such as, for example, an unscented Kalman filter (UKL). The Kalman filter estimates a pose of the autonomous vehicle 12 (where the autonomous vehicle 12 represents a host or ego vehicle) by fusing together GPS data 102 from the GPS 34 (FIG. 1) indicating a position of the autonomous vehicle 12, a map-matching based pose estimate 104, and vehicle dynamics data 106 as input. The Kalman filter fuses the GPS data 102, the map-matching based pose estimate 104, and the vehicle dynamics data 106 together to estimate a host pose 110 of the autonomous vehicle 12. The map-matching based pose estimate 104 is based on the pairs of consistent perception and map lane edges 84 received from the association block 46 and the matching segments 90 of the pair of inconsistent perception and map lane edges 86. That is, in other words, the map-matching based pose estimate 104 is determined based on consistent or matching perception lane edges 66 and map lane edges 68. The map-matching based pose estimate 104 accounts for the transformation between the perception lane edges 66 and the map lane edges 68. The vehicle dynamics data 106 includes dynamics information related to the movement of the autonomous vehicle 12 such as, for example, wheel speed or odometry, lateral acceleration, and longitudinal acceleration.

It is to be appreciated that the GPS data 102 received from the GPS 34 (FIG. 1) may provide a coarse location of the autonomous vehicle 12, and in one embodiment includes an error of up to ten meters. However, the map-matching based pose estimate 104 requires greater precision, and includes a smaller error than what is provided by the GPS data 102. The map-matching based pose estimate 104 accounts for the error in the GPS data 102, thereby providing the Kalman filter with the precision required to estimate the host pose 110.

Referring generally to the figures, the disclosed perception and map edge association system provides various technical effects and benefits. It is to be appreciated sometimes poorly mapped data exists. For example, the map data may include inconsistent or inaccurate information, thereby creating a mismatch between the perception data collected by the sensors and the map data. Furthermore, global navigation satellite system (GNSS) denied environments exist, which create misalignment between perception lane edges and the corresponding map candidates when projecting the map edges in a perception frame. The disclosed perception and map edge association system provides a robust solution and alleviates the missing or inaccurate information within the map data by relaxing the one-to-one relationship between the perception lane edge and the map lane edges in situations where lane counts and geometry between the perception and map data are inconsistent. Specifically, the disclosed perception and map edge association system allows for a one-to-many relationship between inconsistent perception and map lane edges. The disclosed perception and map edge association system also detects partial discrepancies between the perception lane edge candidates and the map lane edge candidates and segments the perception lane edges and the map lane edges accordingly so only consistent data is considered. Furthermore, coarse translational alignment is performed between the perception lane edge candidates and the nearest map lane edge candidate to account for host pose error and map lane bias. Thus, the perception and map edge association system improves localization and scene creation performance for the autonomous vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A perception and map edge association system that is part of an autonomous driving system for an autonomous vehicle, the perception and map edge association system comprising:
one or more controllers executing instructions to:
receive a plurality of perception lane edge candidates that are each representative of a perception lane edges and a plurality of map lane edge candidates that are each representative of a map lane edge;
determine an association cost between each of the plurality of perception lane edge candidates and each of the plurality of map lane edge candidates for one or more lane characteristics;
generate a discrepancy flag in response to determining the association cost between one of the plurality of perception lane edge candidates and one of the plurality of map lane edge candidates is greater than a threshold cost amount;
determine a posterior association probability matrix between each of the plurality of perception lane edge candidates and the plurality of map lane edge candidates based on a current value of a recalculated likelihood of association, wherein the recalculated likelihood of association is an inverse of the association cost;
identify a discrepancy between a selected perception lane edge candidate and a best fit map lane edge candidate for one of the lane characteristics based on the posterior association probability matrix and the discrepancy flag, wherein the selected perception lane edge candidate and the best fit map lane edge candidate are a pair of inconsistent perception and map lane edges;
segment the pair of inconsistent perception and map lane edges into one or more matching segments, wherein the one or more matching segments indicate where the perception lane edge and the map lane edge match one another based on one of the lane characteristics;

determine a translational error based on a likelihood of association, wherein the translational error is determined by:

$$\epsilon = \underset{\epsilon}{\mathrm{argmax}} \sum_i (L_{pimj}(\epsilon))$$

wherein $\epsilon$ is the translational error, $L_{pi\ mj} = L_{pi\ mj}^{pos} * L_{pi\ mj}^{type} * L_{pi\ mj}^{heading} * L_{pi\ mj}^{curvature}$ and $L_{pi\ mj}^{pos}$ refers to a likelihood of association based on position, $L_{pi\ mj}^{type}$ refers to the likelihood of association for either a type of lane line or a color of the lane line, $L_{pi\ mj}^{heading}$ refers to a likelihood of association based on a heading, and $L_{pi\ mj}^{curvature}$ refers to a likelihood of association based on curvature, and $\hat{j}$ is a nearest candidate map lane edge;

build a scene of an environment surrounding the autonomous vehicle based on the matching segments; and control, by the autonomous driving system, steering, braking, and accelerating of the autonomous vehicle based on the scene of the environment.

2. The perception and map edge association system of claim 1, wherein the pair of inconsistent perception and map lane edges are identified based on the discrepancy flag being confirmed as valid.

3. The perception and map edge association system of claim 2, wherein the one or more controllers execute instructions to:

remove a remaining portion of the pair of inconsistent perception and map lane edges from the pair of inconsistent perception and map lane edges;

invalidate the discrepancy flag corresponding to the pair of inconsistent perception and map lane edges; and transmit the matching segments that are part of the pair of inconsistent perception and map lane edges to a Kalman filter.

4. The perception and map edge association system of claim 3, wherein the one or more controllers execute instructions to:

receive, by the Kalman filter, GPS data indicating a position of the autonomous vehicle, a map-matching based pose estimate, and vehicle dynamics data; and estimate a host pose of the autonomous vehicle by fusing the GPS data, the map-matching based pose estimate, and the vehicle dynamics data together.

5. The perception and map edge association system of claim 4, wherein map-matching based pose estimate is based on the matching segments of the pair of inconsistent perception and map lane edges.

6. The perception and map edge association system of claim 1, wherein the pair of inconsistent perception and map lane edges are segmented based on a dyadic decision tree that recursively segments the pair of inconsistent perception and map lane edges at respective midpoints.

7. The perception and map edge association system of claim 1, wherein the nearest candidate map lane edge $\hat{j}$ is expressed as:

$$\hat{j} = \underset{j}{\mathrm{argmax}}(L_{pimj}^{pos}()|\epsilon).$$

8. The perception and map edge association system of claim 1, wherein the recalculated likelihood of association is based on the translational error.

9. The perception and map edge association system of claim 1, wherein the one or more controllers execute instructions to:

predict a predicted association probability matrix between each of the plurality of perception lane edge candidates and the plurality of map lane edge candidates based on a previously calculated association probability matrix at a previous timestep and a prior association probability at timestep zero; and determine the posterior association probability matrix at a current timestep between each of the plurality of perception lane edge candidates and the plurality of map lane edge candidates by updating the predicted association probability matrix with a current value of the likelihood of association at the current timestep.

10. The perception and map edge association system of claim 9, wherein the posterior association probability matrix is determined based on:

$$q_{pm}^t = k q_{pm}^{t-} l_{pm}^t$$

wherein $q_{pm}^t$ represents the posterior association probability matrix, k represents a normalizing constant, $q_{pm}^{t-}$ represents the predicted association probability matrix, and $l_{pm}^t$ represents a current value of the likelihood of association.

11. The perception and map edge association system of claim 1, wherein the one or more lane characteristics refers to one or more of the following: a distance, a type of lane line, a heading, and a curvature between a perception lane edge and a map lane edge.

12. The perception and map edge association system of claim 1, wherein the threshold cost amount is selected to indicate a discrepancy between the perception lane edge candidate and the map lane edge candidate based on one of the lane characteristics.

13. A perception and map edge association system that is part of an autonomous driving system for an autonomous vehicle, the perception and map edge association system comprising:

one or more controllers executing instructions to:

receive a plurality of perception lane edge candidates that are each representative of a perception lane edges and a plurality of map lane edge candidates that are each representative of a map lane edge;

determine an association cost between each of the plurality of perception lane edge candidates and each of the plurality of map lane edge candidates for one or more lane characteristics;

generate a discrepancy flag in response to determining the association cost between one of the plurality of perception lane edge candidates and one of the plurality of map lane edge candidates is greater than a threshold cost amount;

determine a posterior association probability matrix between each of the plurality of perception lane edge candidates and the plurality of map lane edge candidates based on a current value of a recalculated likelihood of association, wherein the recalculated likelihood of association is an inverse of the association cost;

identify a discrepancy between a selected perception lane edge candidate and a best fit map lane edge candidate for one of the lane characteristics based on the posterior association probability matrix and the discrepancy flag, wherein the selected perception lane edge candidate and the best fit edge candidate are a pair of inconsistent perception and map lane edges; and segment the pair of inconsistent perception and map lane edges into one or more matching segments, wherein the one or more matching segments indicate where the perception lane edge and the map lane edge match one another based on one of the lane characteristics, and wherein the pair of inconsistent perception and map lane edges are segmented based on a dyadic decision tree that recursively segments the pair of inconsistent perception and map lane edges at respective midpoints;

determine a translational error based on a likelihood of association, wherein the translational error is determined by:

$$\epsilon = \underset{\epsilon}{\operatorname{argmax}} \sum_i (L_{pim\hat{j}}(\epsilon))$$

wherein $\epsilon$ is the translational error, $L_{pi\ mj} = L_{pi\ mj}^{pos} * L_{pi\ mj}^{type} * L_{pi\ mj}^{heading} * L_{pi\ mj}^{curvature}$ and $L_{pi\ mj}^{pos}$ refers to a likelihood of association based on position, $L_{pi\ mj}^{type}$ refers to the likelihood of association for either a type of lane line or a color of the lane line, $L_{pi\ mj}^{heading}$ refers to a likelihood of association based on a heading, and $L_{pi\ mj}^{curvature}$ refers to a likelihood of association based on curvature, and $\hat{j}$ is a nearest candidate map lane edge;

build a scene of an environment surrounding the autonomous vehicle based on the matching segments; and control, by the autonomous driving system, steering, braking, and accelerating of the autonomous vehicle based on the scene of the environment.

14. The perception and map edge association system of claim 13, wherein the pair of inconsistent perception and map lane edges are identified based on the discrepancy flag being confirmed as valid.

15. The perception and map edge association system of claim 14, wherein the one or more controllers execute instructions to:

remove a remaining portion of the pair of inconsistent perception and map lane edges from the pair of inconsistent perception and map lane edges;

invalidate the discrepancy flag corresponding to the pair of inconsistent perception and map lane edges; and transmit the matching segments that are part of the pair of inconsistent perception and map lane edges to a Kalman filter.

16. The perception and map edge association system of claim 15, wherein the one or more controllers execute instructions to:

receive, by the Kalman filter, GPS data indicating a position of the autonomous vehicle, a map-matching based pose estimate, and vehicle dynamics data; and estimate a host pose of the autonomous vehicle by fusing the GPS data, the map-matching based pose estimate, and the vehicle dynamics data together.

17. The perception and map edge association system of claim 13, wherein the recalculated likelihood of association is based on the translational error.

18. A perception and map edge association system that is part of an autonomous driving system for an autonomous vehicle, the perception and map edge association system comprising:

one or more controllers executing instructions to:

receive a plurality of perception lane edge candidates that are each representative of a perception lane edges and a plurality of map lane edge candidates that are each representative of a map lane edge;

determine an association cost between each of the plurality of perception lane edge candidates and each of the plurality of map lane edge candidates for one or more lane characteristics;

generate a discrepancy flag in response to determining the association cost between one of the plurality of perception lane edge candidates and one of the plurality of map lane edge candidates is greater than a threshold cost amount;

determine a posterior association probability matrix between each of the plurality of perception lane edge candidates and the plurality of map lane edge candidates based on a current value of a recalculated likelihood of association, wherein the recalculated likelihood of association is an inverse of the association cost;

identify a discrepancy between a selected perception lane edge candidate and a best fit map lane edge candidate for one of the lane characteristics based on the posterior association probability matrix and the discrepancy flag, wherein the selected perception lane edge candidate and the best fit map lane edge candidate are a pair of inconsistent perception and map lane edges;

segment the pair of inconsistent perception and map lane edges into one or more matching segments, wherein the one or more matching segments indicate where the perception lane edge and the map lane edge match one another based on one of the lane characteristics, and wherein the pair of inconsistent perception and map lane edges are segmented based on a dyadic decision tree that recursively segments the pair of inconsistent perception and map lane edges at respective midpoints;

remove a remaining portion of the pair of inconsistent perception and map lane edges from the pair of inconsistent perception and map lane edges, wherein the pair of inconsistent perception and map lane edges are identified based on the discrepancy flag being confirmed as valid;

invalidate the discrepancy flag corresponding to the pair of inconsistent perception and map lane edges;

transmit the matching segments that are part of the pair of inconsistent perception and map lane edges to a Kalman filter;

receive, by the Kalman filter, GPS data indicating a position of the autonomous vehicle, a map-matching based pose estimate, and vehicle dynamics data;

estimate a host pose of the autonomous vehicle by fusing the GPS data, the map-matching based pose estimate, and the vehicle dynamics data together, wherein the map-matching based pose estimate is based on the matching segments of the pair of inconsistent perception and map lane edges;

predict a predicted association probability matrix between each of the plurality of perception lane edge candidates and the plurality of map lane edge candidates based on a previously calculated association probability matrix at a previous timestep and a prior association probability at timestep zero; and determine the posterior association probability matrix at a current timestep between each of the plurality of perception lane edge candidates and the plurality of map lane edge candidates by updating the predicted association probability matrix with a current value of the likelihood of association at the current timestep, wherein the posterior association probability matrix is determined based on:

$$q^t_{pm} = k q^{t-}_{pm} l^t_{pm}$$

wherein $q_{pm}^t$ represents the posterior association probability matrix, k represents a normalizing constant, $q_{pm}^{t-}$ represents the predicted association probability matrix, and $l_{pm}^t$ represents a current value of the likelihood of association;

build a scene of an environment surrounding the autonomous vehicle based on the matching segments; and control, by the autonomous driving system, steering, braking, and accelerating of the autonomous vehicle based on the scene of the environment.

* * * * *